Figure 1:
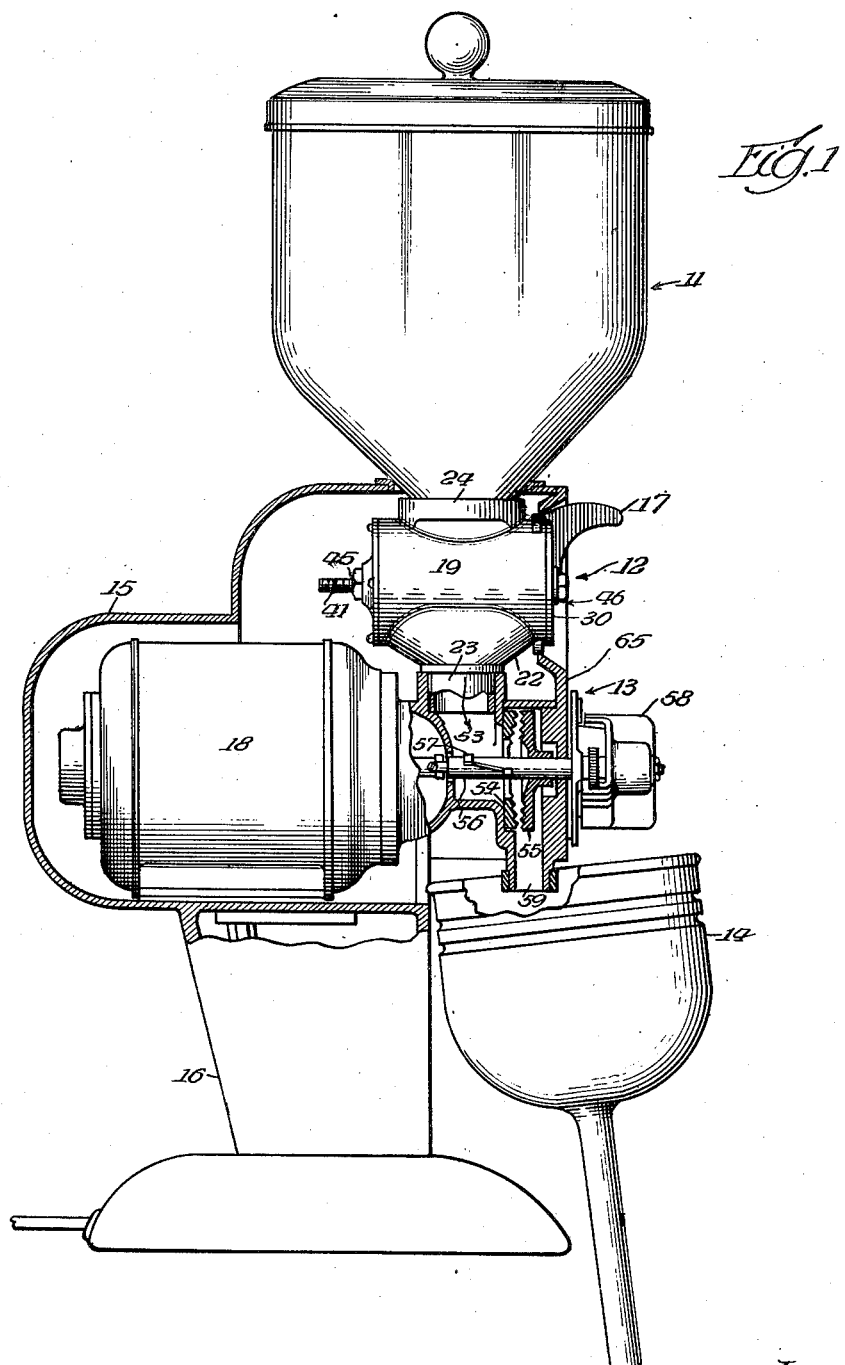

July 17, 1951     R. L. SCHUHMANN     2,560,826
COFFEE GRINDER FEED AND CONTROL DEVICE
Filed Feb. 11, 1946     3 Sheets-Sheet 1

Inventor
Richard L. Schuhmann
By Clarence J. Loftus
atty.

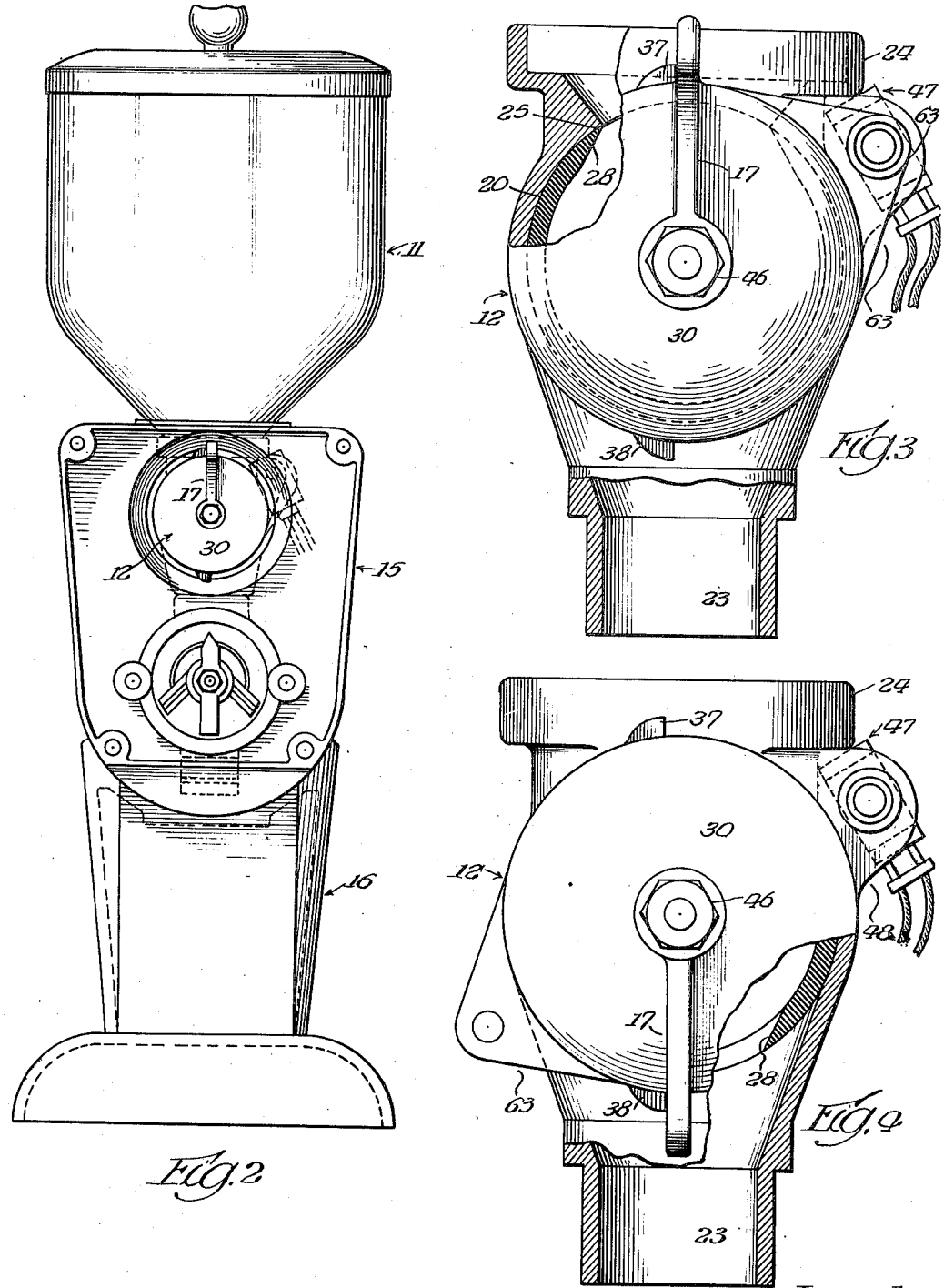

July 17, 1951  R. L. SCHUHMANN  2,560,826
COFFEE GRINDER FEED AND CONTROL DEVICE
Filed Feb. 11, 1946  3 Sheets-Sheet 3
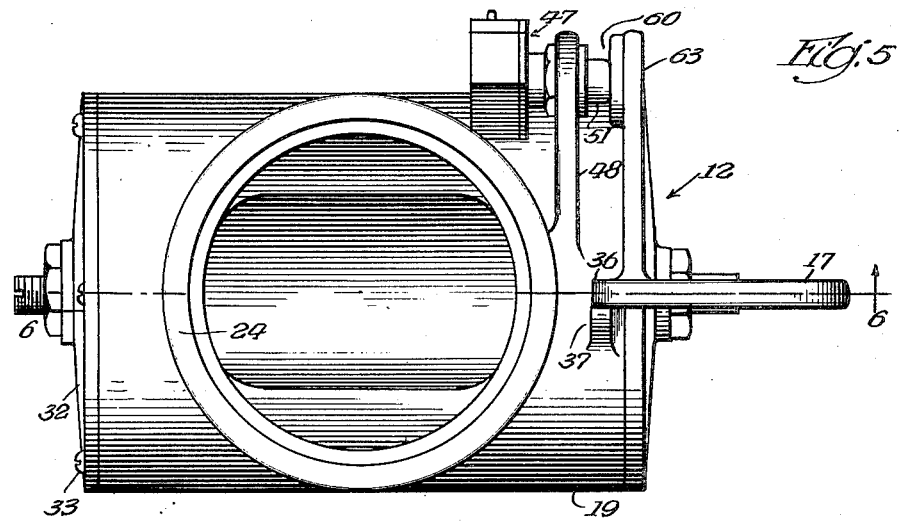
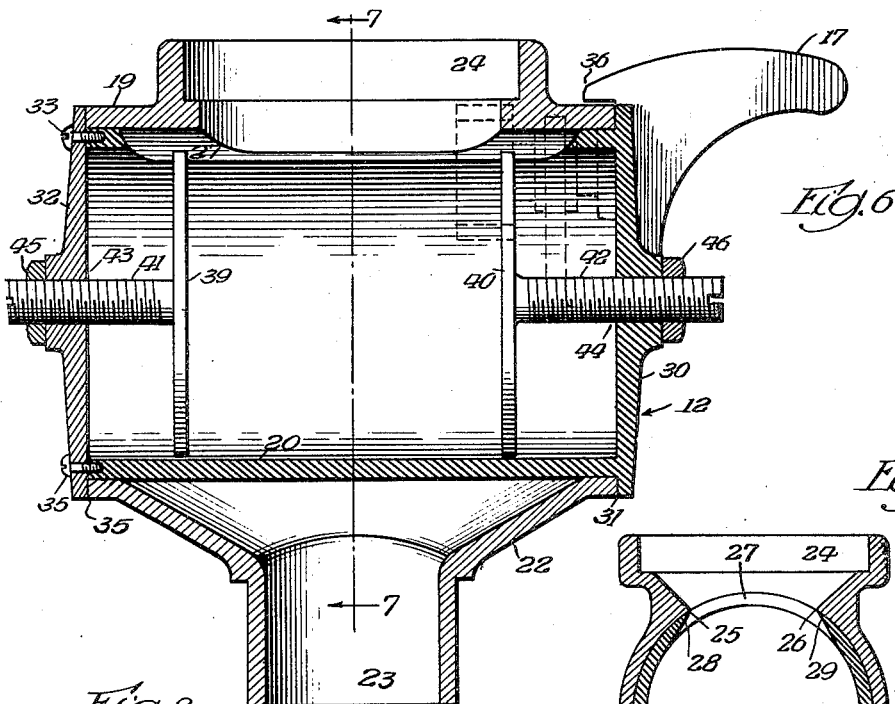
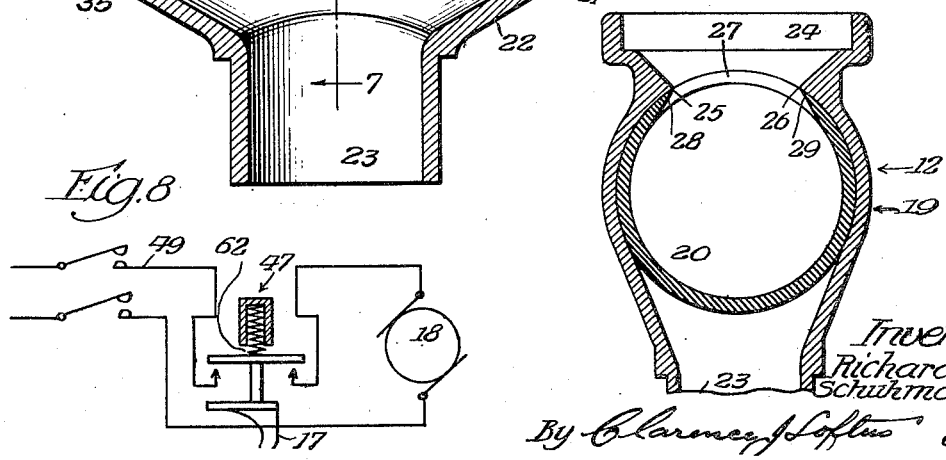
Inventor
Richard L. Schuhmann
By Clarence J. Loftus  atty.

Patented July 17, 1951

2,560,826

UNITED STATES PATENT OFFICE 2,560,826

COFFEE GRINDER FEED AND CONTROL DEVICE

Richard L. Schuhmann, Louisville, Ky., assignor to American Duplex Company, Louisville, Ky., a corporation of Kentucky Application February 11, 1946, Serial No. 646,922

4 Claims. (Cl. 241—63)

The present invention relates to grinding mills and, while it has a wide range of prospective application, it is of particular utility in the conversion of unmeasured bulk coffee into measured quantities of coffee ground to a desired fineness. The invention is therefore hereinbelow described in that connection.

The invention is addressed to the solution of a problem arising from the customary methods of brewing coffee in hotels, restaurants, and other large consuming establishments. When the vendor of hotel-blend coffee grinds the coffee in his own establishment he must either provide an efficient delivery system in order to prevent staleing or must employ expensive packaging equipment. It is therefore of advantage to the vendor to furnish coffee in bulk or bean form and this advantage is reflected in lower costs to consumers, such costs being important factors in enterprises of the classes mentioned above. Further in many of such establishments both the vacuum brewer and the urn, which require different grinds, are used in preparing coffee to be served. Therefore it is desirable that such large consuming establishments provide their own mills, thereby to avoid the cost of grinding in the vendor's plant as well as to minimize staleing.

However, the vacuum brewer requires a small measured amount of extra-fine ground coffee for each gallon of brewed coffee: say, 3 ounces of ground coffee per half-gallon of brewed coffee. It has heretofore been found impractical to weigh out coffee in such quantities, because of the great waste of coffee, unsanitary and offensive spillage, and excessive time consumed by busy kitchen laborers. Therefore it has become current practice for the coffee vendor to supply the large consumer with measured quantities of coffee packed in small containers. Such containers considerably increase the cost of coffee to the vendor, the serving establishment and the ultimate consumer. It is estimated that such cost is three cents per 3 ounce package. A consideration of the large volume of coffee consumed in such establishments readily shows that the elimination of this cost factor is a most desirable objective.

It is a primary object of my invention to provide a coffee grinding mill which is responsive to one simple manual operation to convert unground coffee in bulk form into a measured amount of coffee of a desired fineness. Such a mill avoids the cost of impractical weighing operations and packaging, permits accurate measurements by unskilled operators, and assures the grinding of the predetermined desired amount of coffee.

It is also an object of my invention to provide a novel grinding mill including a grinder and measuring and delivery device cooperatively so arranged as to minimize the labor involved in delivering a measured quantity of coffee and to assure accurate measurement of such quantity.

It is also an object of my invention to provide a relatively simple mill for converting coffee beans into measured quantities of ground coffee, the mill being so arranged that the coffee may directly be delivered into the bowl of a vacuum brewer.

A further object of my invention is to provide an improved volumetric measuring device with means for adjusting the setting of said device to increase or decrease the volume to be delivered thereby.

In accordance with my invention there are provided in combination measuring and delivery means of the type adapted to be selectively adjusted for receiving material to be ground or for releasing such material, normally operative grinding means in communication with the measuring and delivery means and adapted to grind material released therefrom, and means controlled by said measuring and delivery means for automatically disabling said grinding means when said measuring and delivery means is adjusted for receiving material.

The above and other advantages and capabilities of my invention will be apparent from a detailed description of the accompanying drawings in which I have illustrated one form of my invention, but the construction therein shown is to be understood as illustrative and not as defining the limits of my invention.

In the accompanying drawings: Fig. 1 is a side elevational view of a complete electrically-powered coffee grinding plant in accordance with my invention, partly in section; Fig. 2 is a front elevational view of the Fig. 1 embodiment; Fig. 3 is a front elevational view, partly in section, showing the measuring and delivery device included in the Fig. 1 embodiment in the "off" position wherein it is adjusted for receiving material to be measured and ground; Fig. 4 is a similar front elevational view of the measuring and delivery device, showing it in the "on" position for delivering material to the grinder; Fig. 5 is a top plan view of the measuring and delivery device when set for receiving material; Fig. 6 is a longitudinal sectional view of the measuring and delivery device, taken on line 6—6 of Fig. 5 and looking in the direction of the arrows; Fig. 7 is an axial sectional view taken on line 7—7 of Fig. 6; and Fig. 8 shows the circuit arrangement of the switching means provided for disabling the grinder when the measuring and delivery device is set to be filled.

Referring now specifically to Fig. 1, there are shown a hopper 11, a novel combination of a measuring and delivery device and a grinder 13; and the upper bowl of a vacuum brewer 14, the bowl being positioned to receive a measured quantity of coffee of a predetermined grind from the grinder. The measuring and delivery device and grinder are mounted within a hood 15, secured to a foundation 16. The base 16 supports the grinder and measuring and delivering device as a cantilever, permitting ready placement of bowl 14 to receive ground coffee.

The overall operation of this grinding plant is as follows: Coffee beans are deposited in bulk in hopper 11 and introduced into the measuring and delivery device 12, which in turn delivers a measured quantity of the beans to grinder 13. The measured coffee is ground to a desired fineness and then discharged into brewer 14. The mill is so arranged that one operation of a control lever 17 releases the measured quantity of unground coffee from device 12 to grinder 13 and at the same time starts motor 18, which drives the grinder. Conversely, one manual operation of lever 17 places the measuring device 12 in a condition for being refilled, arrests the delivery of unground coffee to the mill and interrupts the flow of electrical power from an energizing source to the motor, thus disabling the grinder.

In Figs. 5, 6, and 7, there are shown the details of the measuring and delivery devices. Its measuring operation is premised on the cooperation of an outer housing member 19 and a generally cylindrical rotatable inner barrel member 20. The inner member is concentric with and closely fitted to the outer member and it turns under the control of lever 17. The outer member is formed with axially open ends and with the general contour of a pipe junction. Its lower portion converges downwardly as indicated at 22 into a discharge orifice 23. Its upper portion is formed with a flanged mouth 24 for receiving coffee to be ground. On each side of the mouth the interior thickened portions forming the base of this flange are cut out to form sharply defined downwardly sloping shoulders 25 and 26. The barrel 20 is formed with an opening 27, defined by longitudinal edges 28 and 29 which register with shoulders 25 and 26 when the measuring and delivery device is in position for filling (as shown in Figs. 5, 6, and 7). In that position the barrel functions as a gate to arrest the flow of unground material to the grinder. When the device is in position for delivery (Fig. 4) the measured coffee drops through openings 27 and 23 to the grinder. In order to assure the delivery of a measured amount of coffee, edges 28 and 29 are formed as knife-edge cutters.

Integral with barrel 20 is an end plate 30, having a larger diameter than the barrel, so that its outer margin slidably bears on end 31 of housing 19 to prevent axial motion of the barrel in one direction. Axial motion of the barrel in the other direction is prevented by an end plate 32 secured to the barrel by screws 33. Plate 32 is also of larger diameter than the barrel 20, so that its outer margin slidably bears against end 35 of housing 19. Barrel 20, retaining plates 30 and 32, and housing 19 are made of cast aluminum and assembled with sufficient tightness to prevent the leakage of coffee.

Lever 17 is integral with end plate 30 and is the manual means by which the device is set to deliver material to the grinder or to receive material from the hopper. Counterclockwise motion of the handle beyond the refilling position is prevented by the bearing of a lug 36 on a limit stop 37. Similarly, clockwise motion beyond the delivery position is prevented by the bearing of lug 36 on a limit stop 38. Stops 37 and 38 are cast in one piece with housing 19 and lug 36 is integral with handle 17.

Adjustment of the device for varying the amount of material measured and delivered is provided by metallic discs 39 and 40, each disc having an individual adjusting screw 41 and 42. The screws turn in threads 43 and 44, respectively, cut in plates 30 and 32, and they are secured in any desired position by lock nuts 45 and 46.

In accordance with one of the novel features of my invention, the measuring and delivery device is provided with a switch 47. This switch is of the plunger type and is mounted on an ear 48 integrally cast on housing 19. The switch is normally biased to a closed position by a spring 62 (Fig. 8) in order to connect motor 18 to a power source (not shown) through a main control switch 49. However, when the dispensing device is set for refilling, as indicated in Fig. 5, a cam surface 60 formed on eccentric portion 63 of plate 30 depresses switch plunger 51 and opens the switch, thereby disabling the grinding means by disconnecting the driving motor from its source. Clockwise movement of handle 17 beyond this position (Fig. 4) disengages the cam from the plunger, permits circuit breaker 47 automatically to reclose, and starts the motor and grinder.

This feature of the invention produces valuable and important results. When the measuring device is set for refilling the flow of excessive amounts of coffee from the hopper to the bowl of the brewer is prevented in two ways: (1) The portion of barrel 20 diametrically opposite to aperture 27 acts as a gate and arrests flow from the measuring and delivery device to the grinder; (2) The grinder is turned off by the switch and cannot run. When the operator turns lever 17, eccentric 63 clears ear 48 and cam 60 releases plunger 51 many degrees preceding the registry of aperture 27 with orifice 23. This assures the turning on of motor 18 and the grinder before any coffee is delivered to the grinder, so that the grinder is at operating speed when coffee is released to it. During this clockwise motion, member 20 continues to block delivery of coffee until knife edge 29 clears the interior surface of casing 19. When the measuring and delivery device is in the delivering position (Fig. 4), the portion of barrel 20 diametrically opposite to aperture 27 acts as a barrier to prevent the flow of coffee from the hopper. Therefore, only the measured amount of coffee can be ground. The grinder will continue to run, thus assuring the grinding of the desired predetermined quantity, until lever 17 is given an approximately 180° counterclockwise turn. Then the measuring and delivery device receives coffee from the hopper stream. One operation of lever 17 then causes knife edge 28 to "bite off" from this stream a measured quantity of coffee, while at the same time turning on the grinder. Thus the cycle is repeated.

This device eliminates the human equation from the measuring and grinding of coffee. Once discs 39 and 40 have been set for the desired quantity, the sole function of the operator is to turn lever 17. Each clockwise turn will cause the proper measured quantity of ground coffee to be delivered. No manual weighing operations or complex manipulations are required.

The grinder may be of any conventional type. That disclosed in my U. S. Patent 2,187,102, issued January 16, 1940, is chosen for the purpose of illustration. Reference is made to that patent for a detailed description of the grinder per se. Briefly however, beans discharged from the measuring and delivery device fall through an opening 53 to the inner or rear face of an inner grinder element 54 and are then forced through an opening in that element into the grinding space between that element and the outer grinding element 55. The inner grinding element is fixedly mounted on a suitable frame secured to motor 18 while the outer grinder element is rigidly secured to a rotatable shaft 56 arranged for longitudinal adjustment between inner and outer limits.

Shaft 56 extends from the outer element 55 inwardly through the opening in inner element 54. The inner end of the shaft is secured to the drive shaft of motor 18 with limited axial freedom of movement to permit longitudinal adjustment of the shaft. The shaft carries, directly behind the inner element 54, a pair of oppositely disposed blades 57 (of which one is shown) which operate, during rotation, to force the unground material through the opening of element 54 into the grinding space. Shaft 56 extends from the outer grinding element 55 outwardly through a cover member 65.

The clearance between the grinding elements 54 and 55 and therefore the adjustment of the mill for "coarse boil," "medium perc," "fine drip," or other desired grind, is determined by the longitudinal setting of knob 58 in a manner specifically described in the above-mentioned patent. The grinding space is in communication with a delivery orifice 59.

No claims are herein directed to the grinding device per se. What is claimed as novel is the general combination of a measuring and delivery device and grinder and that combination as it embodies the features whereby one operation assures the measuring and delivery of coffee and the initiation of the grinding operation or whereby one operation places the measuring and delivery device in condition for refilling, turns off the grinding device, and cuts off the delivery of coffee to the grinding device. This device is extremely reliable, since it provides: (1) a barrier between hopper and grinder during delivery of measured coffee to the grinder; (2) a barrier between measuring device and grinder during delivery of unground coffee to the measuring device; (3) an arrangement for turning off the grinder during refilling of measuring device but for turning it on immediately preceding and during the exhaustion of the measuring device; and (4) an arrangement for keeping the grinder in operative condition until the measuring device is set for refilling.

While I have shown and described what is at present considered to be the preferred embodiment of my invention, it will be obvious to those skilled in the art that various changes and modifications may be made therein without departing from the true scope of the invention.

Having described my invention, I claim:

1. In combination, a grinder having an inlet passage and a discharge passage, electric motor means for driving said grinder, a measuring device comprising a rotatable barrel that is imperforate except for a single opening therein, said measuring device overlying said inlet passage of said grinder, a hopper having a discharge passage overlying said measuring device, manual means for rotating said barrel from a first position whereby its opening is in communication with the hopper discharge passage to a second position whereby its opening is in communication with said inlet passage of said grinder, said barrel when in said first position receiving a predetermined quantity of material from said hopper and when in its second position delivering a predetermined quantity of material to said inlet passage, said barrel opening being substantially coextensive with the hopper discharge passage when said barrel is in its first position and substantially coextensive with said inlet passage when in its second position whereby said barrel blocks the flow of material from the hopper when the barrel is rotated from said first position and blocks the flow from said barrel to said inlet passage when the barrel is rotated from its second position, and means controlled by said manual means for energizing said electric motor and thereby initiating the operation of said grinder as soon as said barrel is removed from said first position and considerably prior to the communication of the barrel opening with the inlet passage, said last named means including switch means and cam means overlying and engaging said switch means when said barrel is in its first position, said cam means being rotatable with said barrel whereby initial movement of said barrel from its first position actuates said switch means to energize said motor.

2. A combination in accordance with claim 1 in which the barrel opening is defined by sharp knife-like edges.

3. A combination in accordance with claim 1 in which stop means engageable with said manual means is provided to prevent rotation of said barrel past its second position and to limit rotation of said barrel between said first and second positions.

4. In combination, a coffee grinder having an inlet passage and a discharge passage, electric motor means for driving said grinder, a measuring device comprising a rotatable barrel that is imperforate except for a single opening therein, said measuring device overlying said inlet passage of said grinder, a hopper having a discharge passage overlying said measuring device, a frame for supporting said grinder, said motor means, said measuring device and said hopper, said frame having a base, manual means for rotating said barrel from a first position whereby its opening is in communication with the hopper discharge passage to a second position whereby its opening is in communication with said inlet passage of said grinder, said barrel when in said first position receiving a predetermined quantity of material from said hopper and when in its second position delivering a predetermined quantity of material to said inlet passage, said barrel opening being substantially coextensive with the hopper discharge passage when said barrel is in its first position and substantially coextensive with said inlet passage when in its second position whereby said barrel blocks the flow of material from the hopper when the barrel is rotated from said first position and blocks the flow from said barrel to said inlet passage when the barrel is rotated from its second position, and means controlled by said manual means for energizing said electric motor and thereby initiating the operation of said grinder as soon as said barrel is removed from said first position and considerably prior to the communication of the barrel opening with the inlet passage, said last named means including switch means and cam means overlying and engaging said switch means when said barrel is in its first position, said cam means being rotatable with said barrel whereby initial movement of said barrel from its first position actuates said switch means to energize said motor, said grinder discharge passage being spaced above said base and offset forwardly from said motor means whereby the bowl of a vacuum coffee brewer may be placed underneath said grinder discharge passage to directly receive the material from said grinder.

RICHARD L. SCHUHMANN.

REFERENCES CITED

The following references are of record in the file of this patent:

UNITED STATES PATENTS

| Number | Name | Date |
|---|---|---|
| 424,226 | Schenkel et al. | Mar. 25, 1890 |
| 512,837 | McElhiney | Jan. 16, 1894 |
| 1,205,285 | Stimpson | Nov. 21, 1916 |
| 1,942,166 | Gisser | Jan. 2, 1934 |
| 2,073,700 | Keilholz | Mar. 16, 1937 |
| 2,156,075 | Alexay | Apr. 25, 1939 |
| 2,187,102 | Schumann | Jan. 16, 1940 |
| 2,339,908 | Brewer | Jan. 25, 1944 |
| 2,461,363 | Zommer | Feb. 8, 1949 |